(12) United States Patent
Noda et al.

(10) Patent No.: US 8,614,613 B2
(45) Date of Patent: Dec. 24, 2013

(54) TRANSFORMER

(75) Inventors: Toshihiro Noda, Chiyoda-ku (JP); Koji Kise, Chiyoda-ku (JP)

(73) Assignee: Mitsubishi Electronic Corporation, Chiyoda-Ku, Tokyo (JP)

( * ) Notice: Subject to any disclaimer, the term of this patent is extended or adjusted under 35 U.S.C. 154(b) by 14 days.

(21) Appl. No.: 13/258,658

(22) PCT Filed: Jun. 23, 2009

(86) PCT No.: PCT/JP2009/061374
§ 371 (c)(1),
(2), (4) Date: Sep. 22, 2011

(87) PCT Pub. No.: WO2010/150345
PCT Pub. Date: Dec. 29, 2010

(65) Prior Publication Data
US 2012/0013427 A1    Jan. 19, 2012

(51) Int. Cl.
*H01F 27/10* (2006.01)
(52) U.S. Cl.
USPC .................................................. 336/57
(58) Field of Classification Search
USPC .................................................. 336/55–62
See application file for complete search history.

(56) References Cited

U.S. PATENT DOCUMENTS

| | | | | |
|---|---|---|---|---|
| 3,261,905 | A | * | 7/1966 | Allen .......................... 174/15.1 |
| 7,760,060 | B2 | * | 7/2010 | Kiuchi et al. ................ 336/58 |
| 2009/0261933 | A1 | | 10/2009 | Kiuchi et al. | |

FOREIGN PATENT DOCUMENTS

| | | |
|---|---|---|
| JP | 54-147552 A | 11/1979 |
| JP | S55-34607 U | 3/1980 |
| JP | 56-94023 U | 7/1981 |
| JP | 05-166639 A | 7/1993 |
| JP | 05-283243 A | 10/1993 |
| JP | 7-198279 A | 8/1995 |
| JP | 10-317959 A | 12/1998 |
| JP | 11-176650 A | 7/1999 |
| JP | 11-189153 A | 7/1999 |
| JP | 2001-304792 A | 10/2001 |
| JP | 2003-166797 A | 6/2003 |
| JP | 2006-240614 A | 9/2006 |
| TW | 200816239 A | 4/2008 |

OTHER PUBLICATIONS

International Search Report (PCT/ISA/210) issued on Aug. 18, 2009, by Japanese Patent Office as the International Searching Authority for International Application No. PCT/JP2009/061374.
Notice of Grounds of Rejection mailed Apr. 16, 2013 issued by the Japanese Patent Office in corresponding Japanese Patent Application No. 2011-519407, and an English translation thereof.
Patent Office Decision dated Apr. 29, 2013 issued by the Taiwanese Patent Office in corresponding Taiwanese Patent Application No. 098125635, and an English translation thereof.

* cited by examiner

*Primary Examiner* — Tuyen Nguyen
(74) *Attorney, Agent, or Firm* — Buchanan Ingersoll & Rooney PC

(57) ABSTRACT

A transformer includes a tank that is attached under a floor of a vehicle, the tank being for housing an iron core, a coil, and an insulating liquid, thereby immersing the iron core and the coil in the insulating liquid; and a cooling unit for air-cooling the insulating liquid that has flowed from tank and returning the insulating liquid to tank, the cooling unit including a plurality of pipes arranged to be spaced from one another such that a spacing in a region relatively closer to floor of the vehicle is greater than a spacing in a region relatively away from floor of the vehicle.

7 Claims, 13 Drawing Sheets

FIG.6
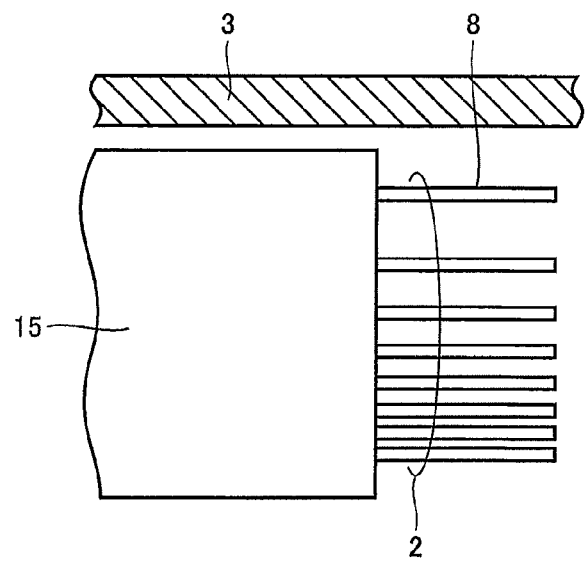
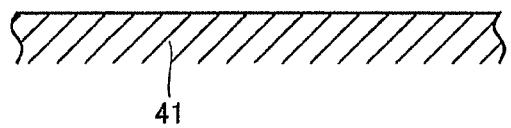
FIG.7
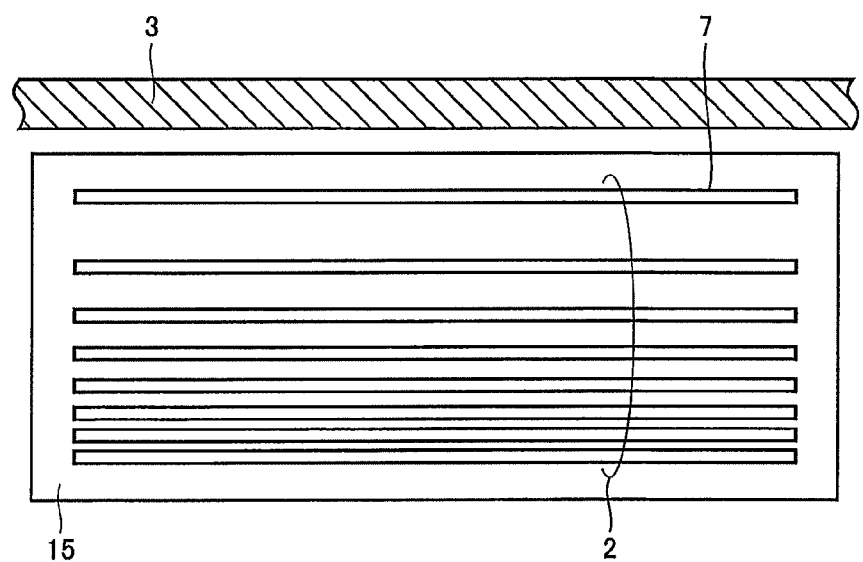
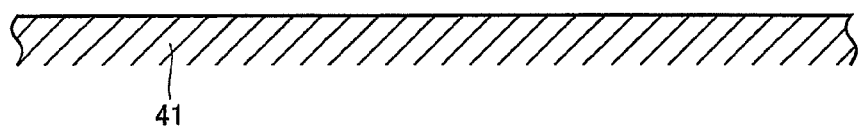

FIG.13
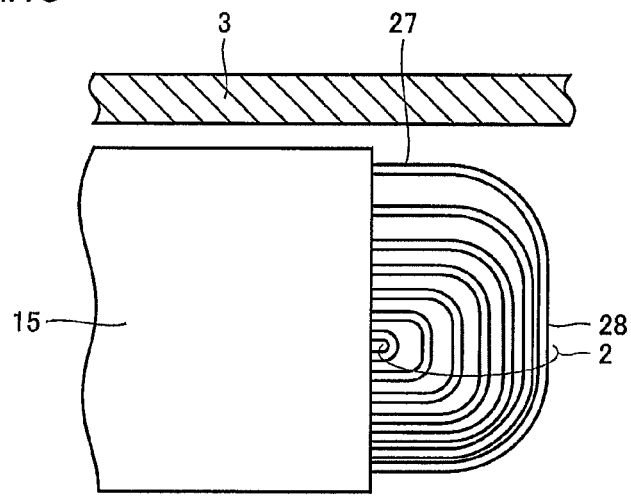
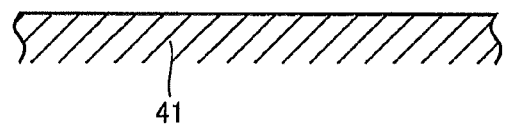
FIG.14
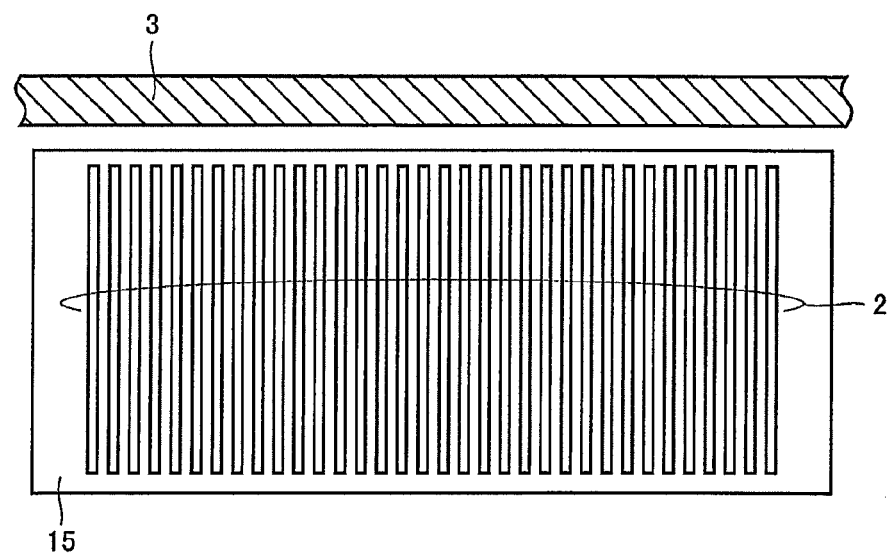
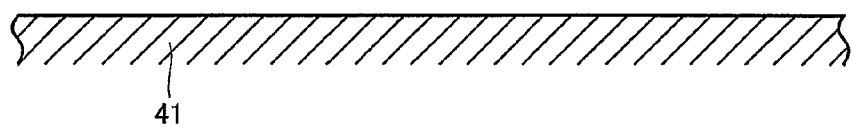

FIG.16
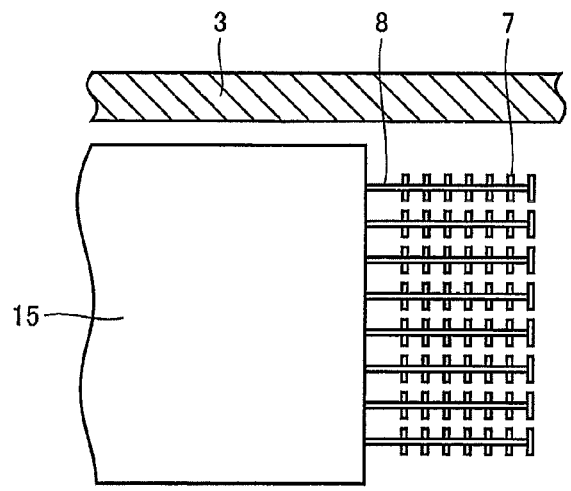
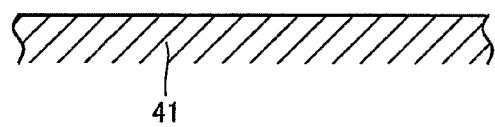
FIG.17
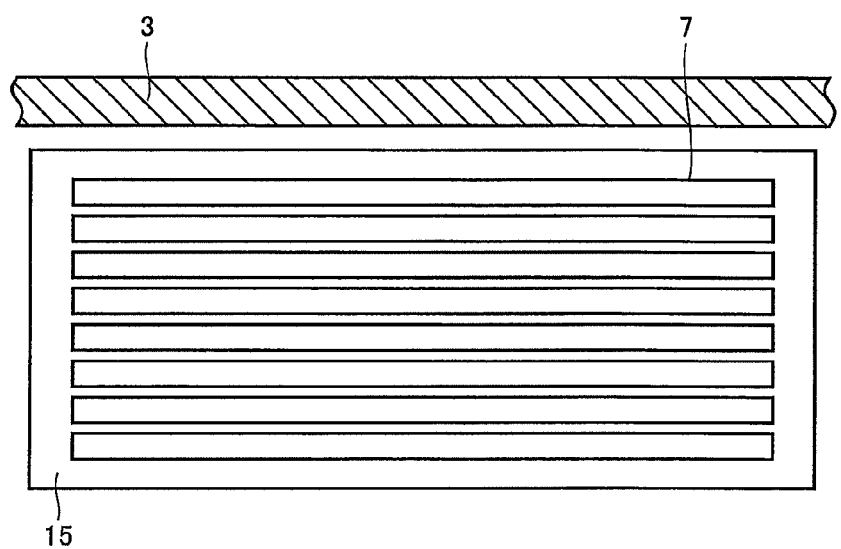
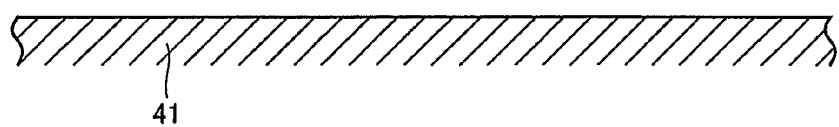

TRANSFORMER

TECHNICAL FIELD

The present invention relates to transformers, and more particularly, to a transformer having a structure for air-cooling an insulating liquid in the transformer.

BACKGROUND ART

A transformer for vehicles is mounted, for example, under the floor of a vehicle. For railway vehicles such as those on local lines, running wind self-cooling-type transformers that use running wind created by running of vehicles are sometimes used in view of maintenance savings and energy savings, instead of forced-air cooling-type transformers that use fans to cool the transformers for vehicles. However, running wind self-cooling-type transformers have a problem in that the cooling performance, i.e., the amount of heat exchange, is lower than that of forced-air cooling-type transformers.

One example of a running wind self-cooling-type transformer is disclosed in Japanese Utility Model Laying-Open No. 56-94023 (PTL 1). That is, the winding of the transformer is cooled by circulating an oil using an oil pump. The oil is then cooled by a radiator pipe that is attached outside the transformer, utilizing running wind during running of a vehicle.

One example of an air-cooling structure is also disclosed in Japanese Patent Laying-Open No. 7-198279 (PTL 2). That is, the direction of a flat surface of a heat-receiving portion of a heat pipe differs by substantially 90° from that of a flat surface of a radiator portion of the heat pipe. This configuration is useful when air is desirably fed to the radiator portion of an assembled radiator in a direction orthogonal to a heat-receiving plate.

CITATION LIST

Patent Literature

PTL 1: Japanese Utility Model Laying-Open No. 56-94023
PTL 2: Japanese Patent Laying-Open No. 7-198279

SUMMARY OF INVENTION

Technical Problem

Running wind self-cooling-type transformers have problems with their cooling performance while vehicles remain stopped. That is, while a vehicle remains stopped, air does not flow well near structures such as a floor surface of the vehicle and side surfaces of a transformer, causing regions where airflow stagnates. For this reason, a velocity distribution is produced in the airflow around each cooling pipe, resulting in lowered cooling efficiency.

Moreover, because the direction of natural convection while a vehicle remains stopped is not the same as the direction of running wind during running of the vehicle, cooling pipes that are to be mounted on a transformer for vehicles or the like typically adopt a circular cross-sectional shape, in order to ensure cooling performance during both stopping and running of the vehicle. For this reason, when air passes between cooling pipes, significant airflow stagnation occurs in a region opposite to an airflow-receiving portion of each cooling pipe, thus resulting in lowered cooling efficiency.

The invention has been made in order to solve the above-described problems. An object of the invention is to provide a transformer in which the cooling performance can be enhanced.

Solution to Problem

A transformer according to one aspect of the invention is a transformer for mounting on a vehicle, including a tank attached under a floor of the vehicle, the tank being for housing an iron core, a coil, and an insulating liquid, thereby immersing the iron core and the coil in the insulating liquid; and a cooling unit for air-cooling the insulating liquid that has flowed from the tank and returning the insulating liquid to the tank, the cooling unit including a plurality of pipes arranged to be spaced from one another such that a spacing in a region relatively closer to the floor of the vehicle is greater than a spacing in a region relatively away from the floor of the vehicle.

A transformer according to another aspect of the invention is a transformer including a tank for housing an iron core, a coil, and an insulating liquid, thereby immersing the iron core and the coil in the insulating liquid; and a cooling unit for air-cooling the insulating liquid that has flowed from the tank and returning the insulating liquid to the tank, the cooling unit including a plurality of pipes arranged to be spaced from one another such that a spacing in a region relatively closer to the tank is greater than a spacing in a region relatively away from the tank.

A transformer according to still another aspect of the invention is a transformer for mounting on a vehicle, including a tank for housing an iron core, a coil, and an insulating liquid, thereby immersing the iron core and the coil in the insulating liquid; and a cooling unit including a plurality of pipes arranged to be spaced from one another, the plurality of pipes being for air-cooling the insulating liquid that has flowed from the tank and returning the insulating liquid to the tank, each of the plurality of pipes being provided so as to have a cross-sectional shape having a longitudinal direction and a shorter-side direction, and have a first portion extending along a traveling direction of the vehicle, and also being provided so that, in the first portion, the longitudinal direction corresponds to a vertical direction, and the shorter-side direction corresponds to a horizontal direction.

A transformer according to yet another aspect of the invention is a transformer for mounting on a vehicle, including a tank for housing an iron core, a coil, and an insulating liquid, thereby immersing the iron core and the coil in the insulating liquid; and a cooling unit including a plurality of pipes arranged to be spaced from one another, the plurality of pipes being for air-cooling the insulating liquid that has flowed from the tank and returning the insulating liquid to the tank, each of the plurality of pipes being provided so as to have a cross-sectional shape having a longitudinal direction and a shorter-side direction, and have a crossing portion extending along a direction crossing a traveling direction of the vehicle, and also being provided so that, in the crossing portion, the shorter-side direction corresponds to a vertical direction, and the longitudinal direction corresponds to a horizontal direction.

Advantageous Effects of Invention

According to the present invention, the cooling performance can be enhanced.

BRIEF DESCRIPTION OF DRAWINGS

FIG. 6 is a diagram showing the cooling unit viewed in a direction VI in FIG. 5.

FIG. 7 is a diagram showing the cooling unit viewed in a direction VII in FIG. 5.

FIG. 13 is a diagram showing the cooling unit viewed in a direction XIII in FIG. 12.

FIG. 14 is a diagram showing the cooling unit viewed in a direction XIV in FIG. 12.

FIG. 16 is a diagram showing the cooling unit viewed in a direction XVI in FIG. 15.

FIG. 17 is a diagram showing the cooling unit viewed in a direction XVII in FIG. 15.

DESCRIPTION OF EMBODIMENTS

Figure 1:
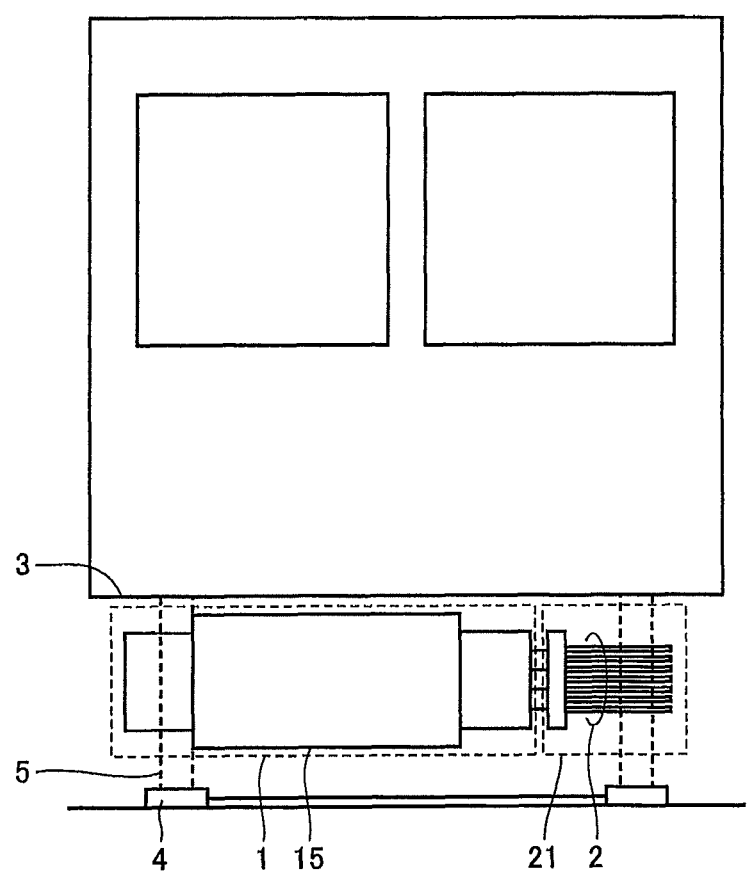
FIG. 1 is a front view of a vehicle according to a first embodiment of the present invention.

Embodiments of the present invention will be described below with reference to the drawings, in which the same or corresponding parts have the same reference characters allotted, and the description thereof will not be repeated.

First Embodiment

Figure 2:
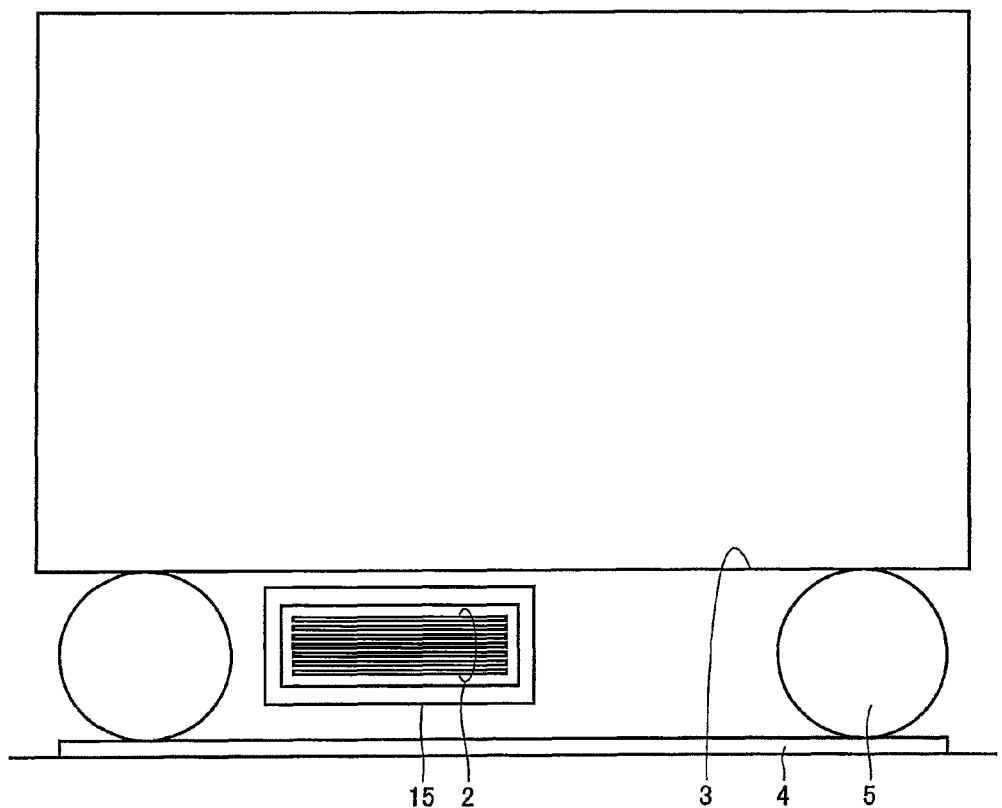
FIG. 2 is a side view of the vehicle according to the first embodiment of the present invention.
Figure 3:
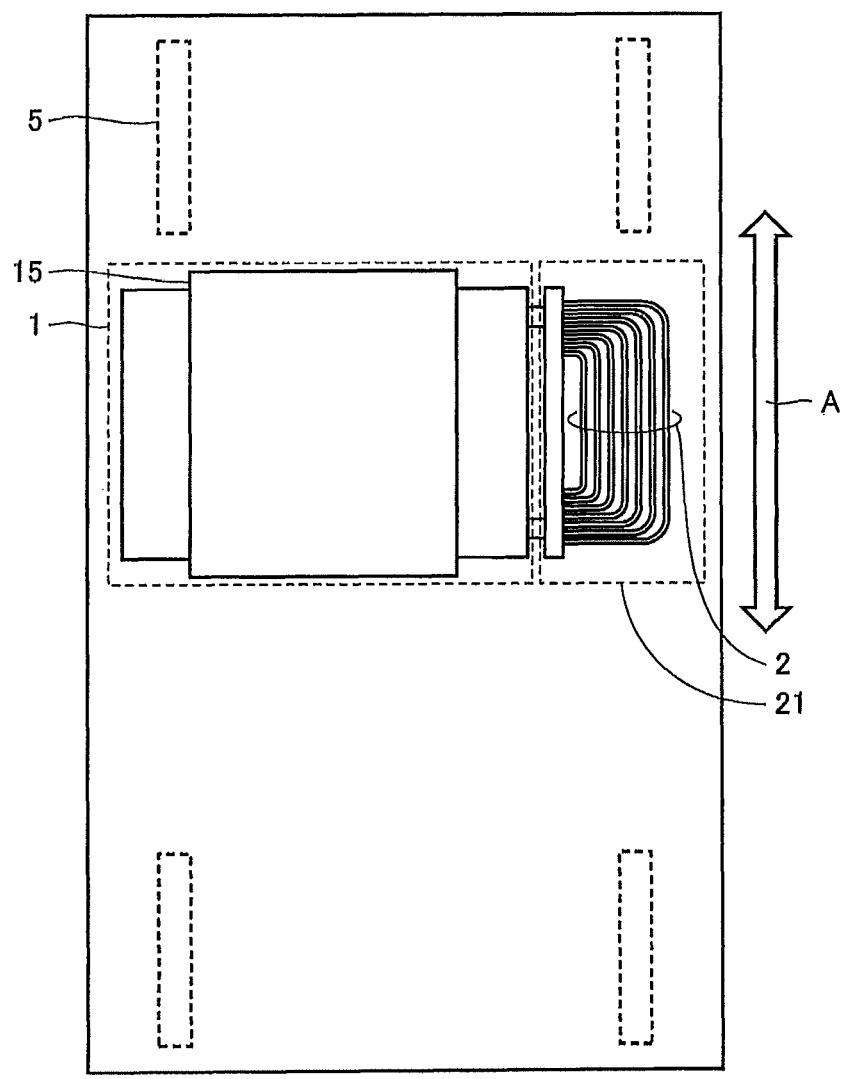
FIG. 3 is a top view of the vehicle according to the first embodiment of the present invention.

FIG. 1 is a front view of a vehicle according to a first embodiment of the present invention. FIG. 2 is a side view of the vehicle according to the first embodiment of the present invention. FIG. 3 is a top view of the vehicle according to the first embodiment of the present invention.

Referring to FIGS. 1 to 3, a vehicle 201 is, for example, a train that runs on a rail 4, and includes a transformer 101 and a wheel 5. Transformer 101 includes a transforming unit 1 and a cooling unit 21. Transforming unit 1 includes a tank 15. In FIG. 3, an arrow A represents a traveling direction of vehicle 201.

Transforming unit 1 is present near a side surface of cooling unit 21 in transformer 101, and a floor 3 of the vehicle is present near an upper surface of cooling unit 21. Tank 15 is attached under floor 3 of vehicle 201. Cooling unit 21 also includes a plurality of cooling pipes 2 that are arranged in seven stages horizontally to the ground, and are arranged in seven stages vertically to the ground.

Figure 4:
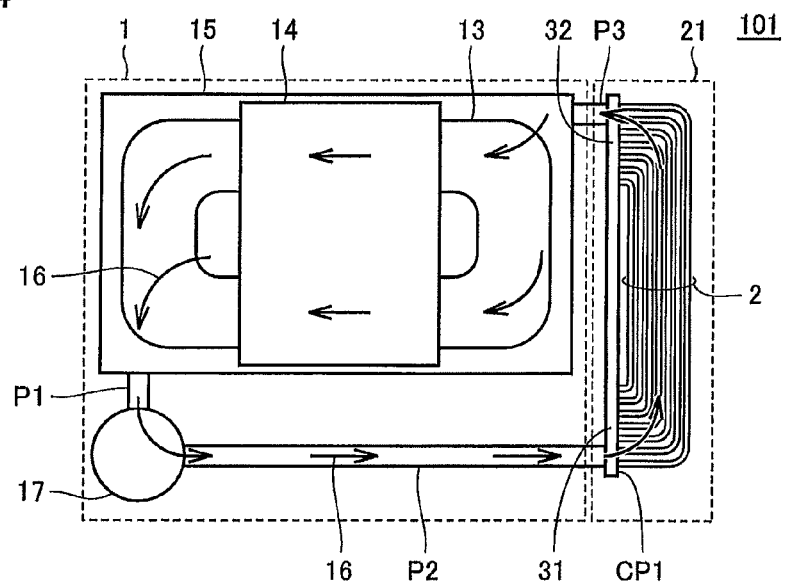
FIG. 4 is a diagram showing in detail the structure of the transformer according to the first embodiment of the present invention.

FIG. 4 is a diagram showing in detail the configuration of the transformer according to the first embodiment of the present invention.

Referring to FIG. 4, transformer 101 includes transforming unit 1 and cooling unit 21. Transforming unit 1 includes a coil 13, an iron core 14, tank 15, a pump 17, and pipes P1, P2, P3. Cooling unit 21 includes the plurality of cooling pipes 2 and a common pipe CP1.

Transformer 101 is, for example, a shell-type transformer. Iron core 14 has opposing first and second side surfaces, and first and second windows that penetrate the first and second side surfaces. Coil 13 is wound so as to pass through first and second windows.

Transformer 101 is filled with an insulating oil 16. Tank 15 houses coil 13 and iron core 14. Coil 13 and iron core 14 are housed in tank 15, and insulating oil 16 is also housed in tank 15, thereby allowing coil 13 and iron core 14 to be immersed in insulating oil 16. Transformer 101 is insulated by and cooled with insulating oil 16. Cooling unit 21 air-cools insulating oil 16 that has flowed from tank 15 and returns it to tank 15. Transformer 101 may also be filled with any other insulating liquid instead of insulating oil 16.

Heat produced from coil 13, iron core 14, and the like moves to insulating oil 16, and insulating oil 16, whose temperature has been increased by the heat, is then delivered to cooling unit 21 through pump 17.

The increased temperature of insulating oil 16 is lowered because insulating oil 16 conducts, while flowing through cooling pipes 2, its heat to the air flowing outside cooling pipes 2. Insulating oil 16 is subsequently delivered to transforming unit 1 again, in order to cool coil 13, iron core 14, and the like. The air flows outside cooling pipes 2 due to natural convection while the vehicle remains stopped, and it flows due to running wind during running of the vehicle.

Pump 17 cools coil 13 by circulating insulating oil 16 in transformer 101, as represented by arrows shown in the figure. Insulating oil 16 is circulated by pump 17 sequentially through tank 15, pipe P1, pump 17, pipe P2, an input portion 31 of common pipe CP1, the plurality of cooling pipes 2, an output portion 32 of common pipe CP1, pipe P3, and tank 15.

Input portion 31 and output portion 32 of common pipe CP1 are not communicated with each other inside common pipe CP1, and connected through the plurality of cooling pipes 2. Input portion 31 of common pipe CP1 connects pipe P2 to the plurality of cooling pipes 2. Output portion 32 of common pipe CP1 connects pipe P3 to the plurality of cooling pipes 2.

Figure 5:
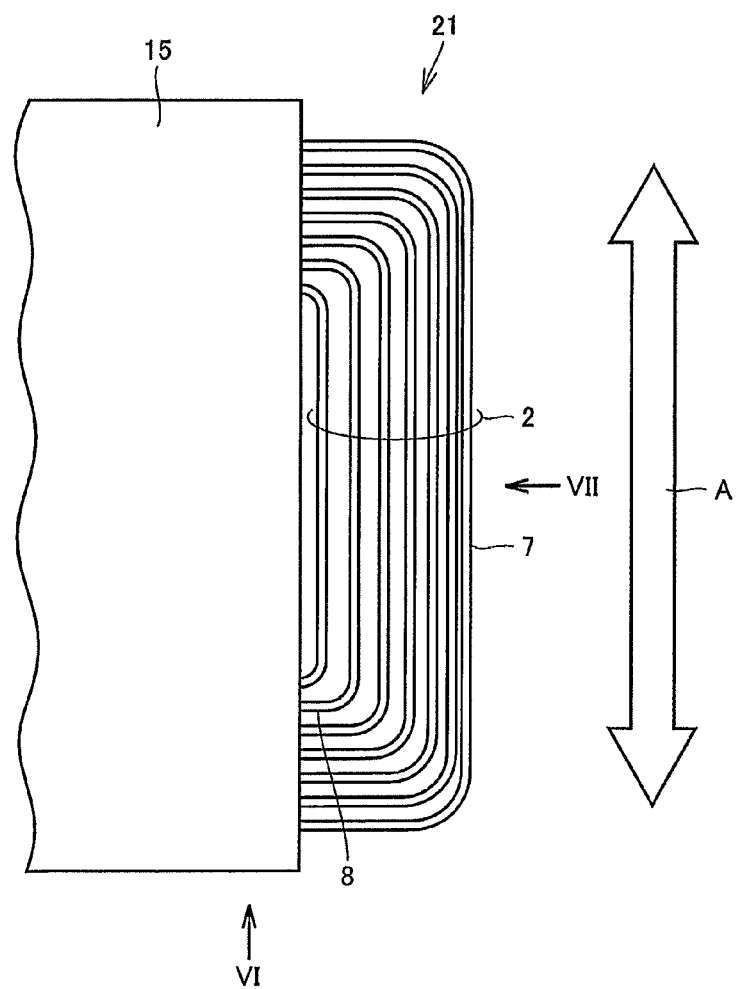
FIG. 5 is a diagram showing in detail the structure of a cooling unit in the transformer according to the first embodiment of the present invention.

FIG. 5 is a diagram showing in detail the configuration of the cooling unit in the transformer according to the first embodiment of the present invention. FIG. 5 corresponds to a top view of the vehicle shown in FIG. 3, wherein an arrow A represents the traveling direction of the vehicle. For the sake of simplicity, common pipe CP1, and pipes P2, P3 are not shown.

FIG. 6 is a diagram showing the cooling unit viewed in a direction VI in FIG. 5. FIG. 7 is a diagram showing the cooling unit viewed in a direction VII in FIG. 5.

As shown in FIG. 5, the plurality of cooling pipes 2 are arranged to be spaced from one another such that a spacing in a region relatively closer to tank 15 is greater than a spacing in a region relatively away from tank 15.

Further, as shown in FIGS. 6 and 7, the plurality of cooling pipes 2 are arranged to be spaced from one another such that a spacing in a region relatively closer to floor 3 of the vehicle is greater than a spacing in a region relatively away from floor 3 of the vehicle.

Each of cooling pipes 2 includes a cooling pipe 7, which is a portion that extends along a traveling direction A of the vehicle, and a cooling pipe 8, which is a portion that extends in a direction crossing the traveling direction of the vehicle.

In transformer 101, while the vehicle remains stopped, the temperature of the air is increased by the heat that has moved from cooling pipes 2, and this air flows in the direction toward floor 3 of the vehicle from ground 41.

A case in which it is assumed that a plurality of cooling pipes 2 in a cooling unit 21 are equally spaced will now be considered.

Figure 8:
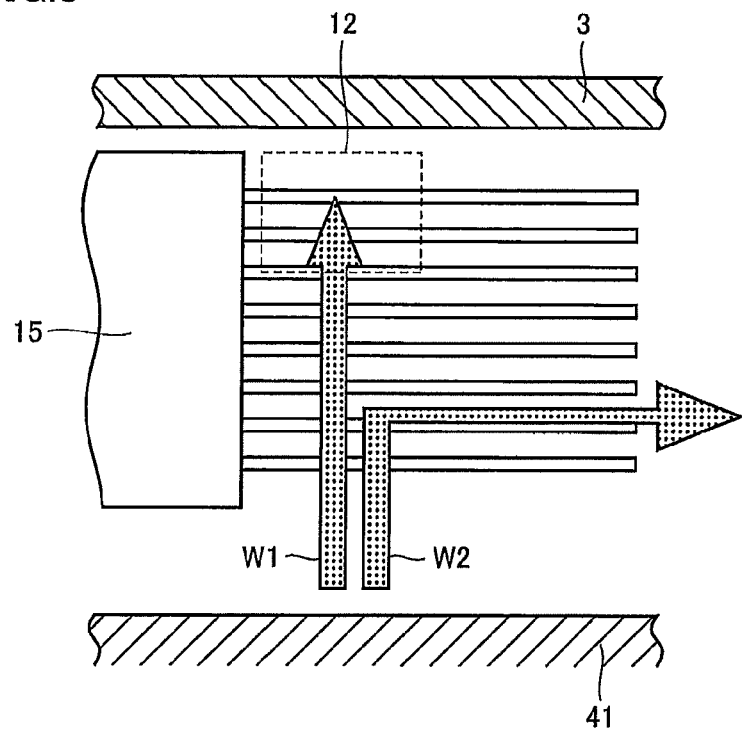
FIG. 8 is a diagram showing airflows in a transformer where it is assumed that a plurality of cooling pipes 2 in a cooling unit 21 are equally spaced.

FIG. 8 is a diagram showing airflows in a transformer where it is assumed that a plurality of cooling pipes 2 in a cooling unit 21 are equally spaced. FIG. 8 and FIGS. 9 to 11 described below correspond to figures each showing the cooling unit viewed in direction VI in FIG. 5.

Referring to FIG. 8, a tank 15 of a transforming unit 1 is present on a side surface of a cooling unit 21, and a floor 3 of a vehicle is present on an upper surface of cooling unit 21. Thus, as represented by an arrow W1, air flowing upward from ground 41 in the direction toward floor 3 of the vehicle stagnates near floor 3. That is, a stagnation region 12 is created in which the air that has flowed upward from rail 4 toward floor 3 of the vehicle stagnates. Cooling pipes disposed in stagnation region 12 of airflow have lower cooling performance for an insulating oil.

Moreover, as represented by an arrow W2, the air flowing upward from ground 41 in the direction toward floor 3 of the vehicle escapes out of transformer 101 horizontally before reaching near floor 3 of the vehicle.

Thus, in the transformer where the plurality of cooling pipes 2 in cooling unit 21 are equally spaced, variations in airflow speed around each cooling pipe 2 are produced, resulting in lowered cooling efficiency.

In contrast, in the transformer according to the first embodiment of the present invention, the cooling pipes are unequally spaced, thereby reducing airflow stagnation while the vehicle remains stopped, allowing the cooling performance to be increased. That is, the spacing between cooling pipes 2 is increased toward transforming unit 1, and the spacing between cooling pipes 2 is increased toward floor 3 of the vehicle.

Figure 9:
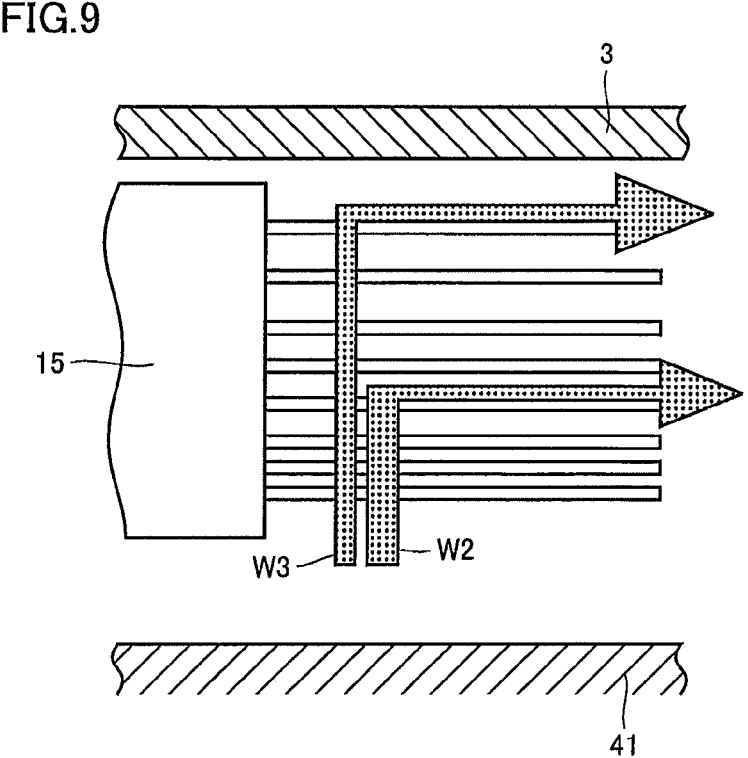
FIG. 9 is a diagram showing airflows in a transformer where the spacing between cooling pipes 2 is increased toward a floor 3 of a vehicle.

FIG. 9 is a diagram showing airflows in a transformer where the spacing between cooling pipes 2 is increased toward a floor 3 of a vehicle.

Increasing the spacing between cooling pipes 2 toward floor 3 of the vehicle allows the air flowing upward from ground 41 in the direction toward floor 3 of the vehicle to easily pass through a region relatively closer to floor 3, rather than through a region relatively away from floor 3, and then flow out of transformer 101. That is, the amount of the air passing through the region relatively closer to floor 3 of the vehicle is greater than the amount of the air passing through the region relatively away from floor 3. Therefore, as shown in FIG. 9, the flow of air flowing upward from ground 41 in the direction toward floor 3 of the vehicle can be improved from arrow W1 to an airflow as represented by an arrow W3, allowing the air that has flowed upward from a rail 4 toward floor 3 of the vehicle to be prevented from stagnating near floor 3 of the vehicle.

Figure 10:
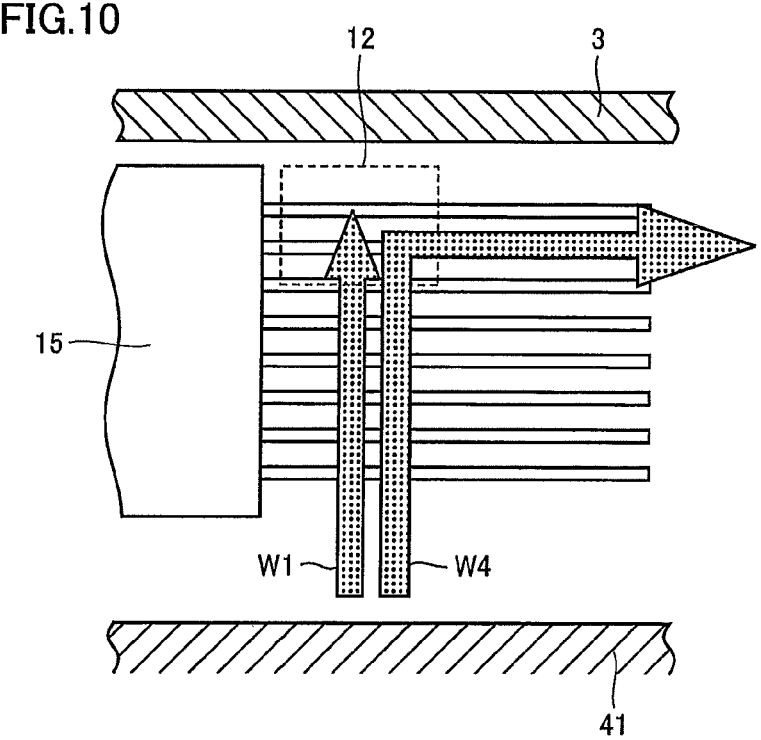
FIG. 10 is a diagram showing an airflow in a transformer where the spacing between cooling pipes 2 is increased toward a transforming unit 1.

FIG. 10 is a diagram showing airflows in a transformer where the spacing between cooling pipes 2 is increased toward transforming unit 1.

Increasing the spacing between cooling pipes 2 toward transforming unit 1 as shown in FIG. 5. This allows the flow of air flowing upward from ground 41 in the direction toward floor 3 of the vehicle to be improved from arrow W2 shown in FIG. 8 to an airflow as represented by an arrow W4, as shown in FIG. 10. That is, the air flowing upward from ground 41 in the direction toward floor 3 of the vehicle can be prevented from escaping out of transformer 101 horizontally before reaching near floor 3 of the vehicle.

Moreover, the air flowing upward from ground 41 in the direction toward floor 3 of the vehicle can easily flow through a region relatively closer to transforming unit 1, rather than through a region relatively away therefrom. Hence, the amount of the air passing through the region relatively closer to transforming unit 1 is greater than the amount of the air passing through the region relatively away from transforming unit 1. This allows the cooling performance of cooling pipes disposed in stagnation region 12 of airflow to be enhanced.

Figure 11:
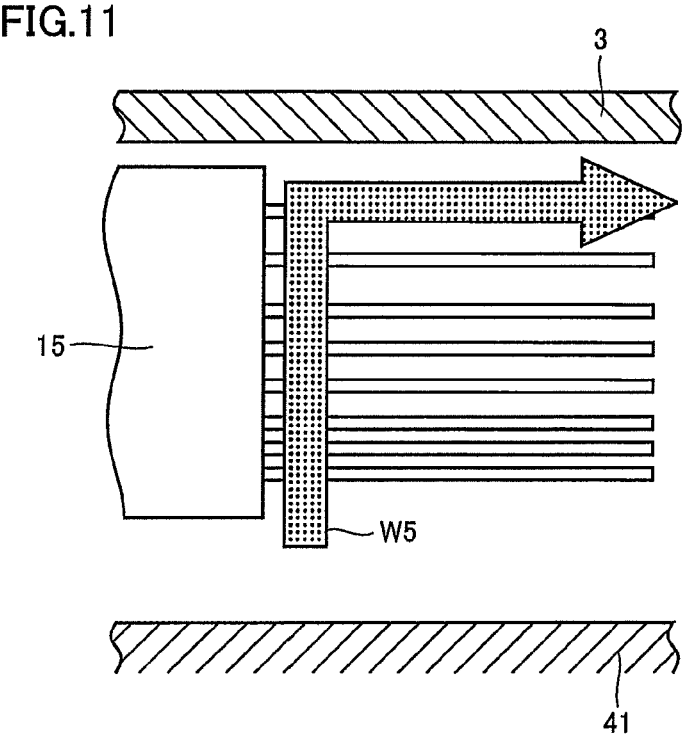
FIG. 11 is a diagram showing an airflow in the transformer according to the first embodiment of the present invention.

FIG. 11 is a diagram showing an airflow in the transformer according to the first embodiment of the present invention.

Referring to FIG. 11, in transformer 101, the spacing between cooling pipes 2 is increased toward transforming unit 1, and the spacing between cooling pipes 2 is increased toward floor 3 of the vehicle. This allows air flowing upward from ground 41 in the direction toward floor 3 of the vehicle to be prevented from stagnating near floor 3 of the vehicle, and also from escaping out of transformer 101 horizontally before reaching near floor 3 of the vehicle. That is, the flow of air flowing upward from ground 41 in the direction toward floor 3 of the vehicle can be improved from arrows W1 and W2 shown in FIG. 8 to an airflow as represented by an arrow W5.

Therefore, in the transformer according to the first embodiment of the present invention, because the flow of air in cooling unit 21 can be equalized, the pressure loss in stagnation region 12 can be reduced, consequently causing cooling air to pass in stagnation region 12, leading to improved cooling efficiency. That is, the cooling performance can be enhanced by reducing the stagnation of natural convection that occurs while the vehicle remains stopped.

Further, as shown in FIG. 5, each cooling pipe 2 is arranged so that the spacing between each other gradually increases toward a region relatively closer to tank 15 from a region relatively away from tank 15. This configuration allows the air flowing upward from ground 41 in the direction of floor 3 of the vehicle to pass more easily in a region closer to transforming unit 1, thus allowing the flow of air in cooling unit 21 to be further equalized.

Further, as shown in FIGS. 6 and 7, the plurality of cooling pipes 2 are arranged so that the spacing between each other gradually increases toward a region relatively closer to floor 3 of the vehicle from a region relatively away from floor 3 of the vehicle. This configuration allows the air from transforming unit 1 toward the outside of transformer 101 to pass more easily through a region closer to floor 3 of the vehicle, thus allowing variations in airflow speed in cooling unit 21 to be further suppressed.

Another embodiment of the present invention will be described next with reference to the drawings, in which the same or corresponding parts have the same reference characters allotted, and the description thereof will not be repeated.

Second Embodiment

The present embodiment relates to a transformer in which the arrangement of cooling pipes is modified, as compared to the transformer according to the first embodiment. The transformer according to the present embodiment is the same as the transformer according to the first embodiment except for the contents described below.

Figure 12:
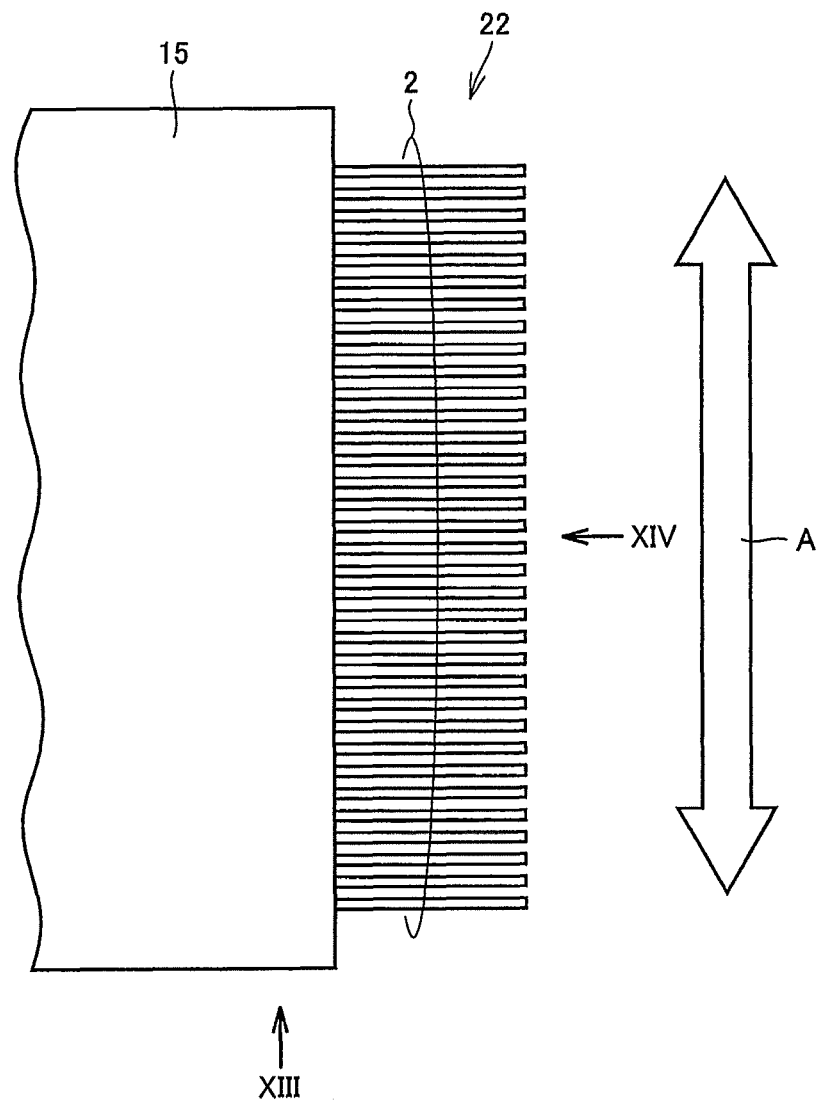
FIG. 12 is a diagram showing in detail the structure of a cooling unit in a transformer according to a second embodiment of the present invention.

FIG. 12 is a diagram showing in detail the configuration of a cooling unit in the transformer according to the second embodiment of the present invention. FIG. 12 corresponds to a top view of the vehicle shown in FIG. 3, wherein an arrow A represents the traveling direction of the vehicle. For the sake of simplicity, common pipe CP1 and pipes P2, P3 are not shown.

FIG. 13 is a diagram showing the cooling unit viewed in a direction XIII in FIG. 12. FIG. 14 is a diagram showing the cooling unit viewed in a direction XIV in FIG. 12.

Referring to FIGS. 12 to 14, the transformer according to the second embodiment of the present invention includes a cooling unit 22 instead of cooling unit 21, as compared to the transformer according to the first embodiment of the present invention.

Cooling unit 22 includes a plurality of cooling pipes 2 that are arranged in 34 stages along a traveling direction A of vehicle 201, and are arranged in seven stages in a direction crossing traveling direction A of vehicle 201. Each of cooling pipes 2 extends in the form of a substantially semi-circular shape so as to cross traveling direction A of vehicle 201. Each of cooling pipes 2 includes a cooling pipe 27, which is a portion that extends horizontally, and a cooling pipe 28, which is a portion that extends vertically.

As shown in FIG. 13, the plurality of cooling pipes 2 are arranged to be spaced from one another such that a spacing in a region relatively closer to tank 15 is greater than a spacing in a region relatively away from tank 15.

Further, the plurality of cooling pipes 2 are arranged to be spaced from one another such that a spacing in a region relatively closer to floor 3 of the vehicle is greater than a spacing in a region relatively away from floor 3 of the vehicle.

Therefore, as with the transformer according to the first embodiment, in the transformer according to the second embodiment of the present invention, air flowing upward from ground 41 in the direction toward floor 3 of the vehicle can be prevented from stagnating near floor 3 of the vehicle, and also from escaping out of transformer 101 horizontally before reaching near floor 3 of the vehicle.

That is, because the flow of air in cooling unit 21 can be equalized, the pressure loss in stagnation region 12 can be reduced, consequently causing cooling air to pass in stagnation region 12, leading to improved cooling efficiency. The cooling performance can be enhanced by reducing the stagnation of natural convection that occurs while the vehicle remains stopped.

The transformer is otherwise the same as the transformer according to the first embodiment in terms of configuration and operation; thus, the detailed description is not repeated herein.

Another embodiment of the present invention will be described next with reference to the drawings, in which the same or corresponding parts have the same reference characters allotted, and the description thereof will not be repeated.

Third Embodiment

The present embodiment relates to a transformer in which the cross-sectional shape of cooling pipes is modified, as compared to the transformer according to the first embodiment. The transformer according to the present embodiment is the same as the transformer according to the first embodiment except for the contents described below.

Figure 15:
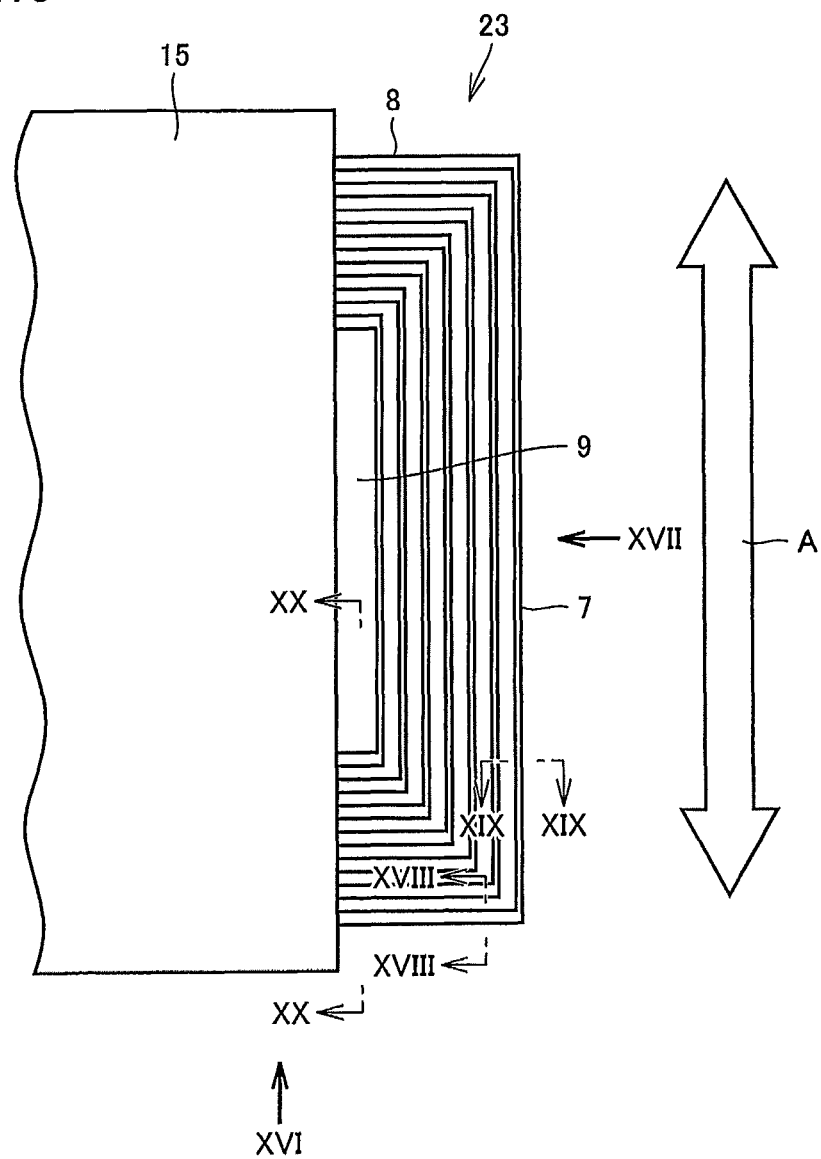
FIG. 15 is a diagram showing in detail the structure of a cooling unit in a transformer according to a third embodiment of the present invention.

FIG. 15 is a diagram showing in detail the configuration of a cooling unit in a transformer according to a third embodiment of the present invention. FIG. 15 corresponds to a top view of the vehicle shown in FIG. 3, wherein an arrow A represents the traveling direction of the vehicle. For the sake of simplicity, common pipe CP1 and pipes P2, P3 are not shown.

FIG. 16 is a diagram showing the cooling unit viewed in a direction XVI in FIG. 15. FIG. 17 is a diagram showing the cooling unit viewed in a direction XVII in FIG. 15.

Referring to FIGS. 15 to 17, the transformer according to the third embodiment of the present invention includes a cooling unit 23 instead of cooling unit 21, as compared to the transformer according to the first embodiment of the present invention.

Cooling unit 23 includes a plurality of cooling pipes 2 that are arranged in seven stages horizontally to the ground, and are arranged in eight stages vertically to the ground.

Each of cooling pipes 2 includes cooling pipe 7, which is a portion that extends along traveling direction A of the vehicle, and cooling pipe 8, which is a portion that extends in a direction crossing the traveling direction of the vehicle.

Each cooling pipe 7 and each cooling pipe 8 are connected such that they are substantially orthogonal to each other. This structure allows the area of contact of the cooling pipes with air to be increased, as compared to the structure of the transformer according to the first embodiment of the present invention, in which the connecting portion between each cooling pipe 7 and each cooling pipe 8 is curved. Therefore, the cooling performance can be further enhanced.

Cooling unit 23 also has an opening 9, which is a space surrounded by transforming unit 1 and cooling pipes 2.

Figure 18A:
FIG. 18A is a diagram showing an example of a cross-sectional shape of cooling pipe 7 in the transformer according to the third embodiment of the present invention.
Figure 18B:
FIG. 18B is a diagram showing an example of a cross-sectional shape of cooling pipe 7 in the transformer according to the third embodiment of the present invention.

FIGS. 18A and 18B are diagrams showing examples of cross-sectional shapes of cooling pipes 7 in the transformer according to the third embodiment of the present invention. Each of FIGS. 18A and 18B shows a cross section of the cooling unit along XVIII-XVIII in FIG. 15.

Figure 19A:
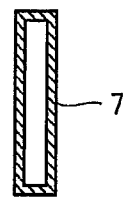
FIG. 19A is a diagram showing an example of a cross-sectional shape of cooling pipe 7 in the transformer according to the third embodiment of the present invention.
Figure 19B:
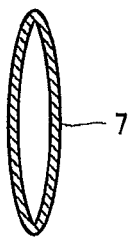
FIG. 19B is a diagram showing an example of a cross-sectional shape of cooling pipe 7 in the transformer according to the third embodiment of the present invention.

FIGS. 19A and 19B are diagrams showing examples of cross-sectional shapes of cooling pipes 8 in the transformer according to the third embodiment of the present invention. Each of FIGS. 19A and 19B shows a cross section of a cooling unit along XIX-XIX in FIG. 15.

Each of cooling pipes 2 has a cross-sectional shape having a longitudinal direction and a shorter-side direction when taken along a plane orthogonal to an extending direction thereof. Each of cooling pipes 2 is provided so that, in each cooling pipe 7, the longitudinal direction corresponds to the vertical direction, and the shorter-side direction corresponds to the horizontal direction. Each of cooling pipes 2 is also provided so that, in each cooling pipe 8, the shorter-side direction corresponds to the vertical direction, and the longitudinal direction corresponds to the horizontal direction.

As shown in FIGS. 18A, 18B, 19A, and 19B, each of cooling pipes 7 and 8 has, for example, a rectangular or oval cross-sectional shape.

Thus, in cooling pipes 7 in the transformer according to the third embodiment of the present invention, as compared to cases where cooling pipes have circular cross-sectional shapes as in conventional transformers for vehicles, although the cross-sectional area of each cooling pipe is equal, the area parallel to an extending surface of rail 4, i.e., the area extending in a direction at a right angle to the airflow in the direction toward floor 3 of the vehicle from ground 41, is smaller than in conventional examples. This reduces the pressure loss against the airflow in the direction toward floor 3 of the vehicle from ground 41, thus causing a greater amount of air to flow into cooling unit 23 from the ground 41 side. Therefore, the flow rate of the air due to natural convection while the vehicle remains stopped can be increased, allowing the cooling performance to be enhanced.

Moreover, in cooling pipes 8 in the transformer according to the third embodiment of the present invention, as compared to cases where cooling pipes have circular cross-sectional shapes as in conventional transformers for vehicles, although the cross-sectional area of each cooling pipe is equal, the area extending in a direction at a right angle to an extending surface of rail 4, i.e., the area extending in a direction at a right angle to the airflow from forward of the vehicle, is smaller than in conventional examples. This increases the cross-sectional area of the air path during running, so as to reduce the pressure loss against the airflow from forward of the vehicle. Therefore, a greater amount of air can flow in from forward of the vehicle, allowing the cooling performance to be enhanced.

Figure 20:
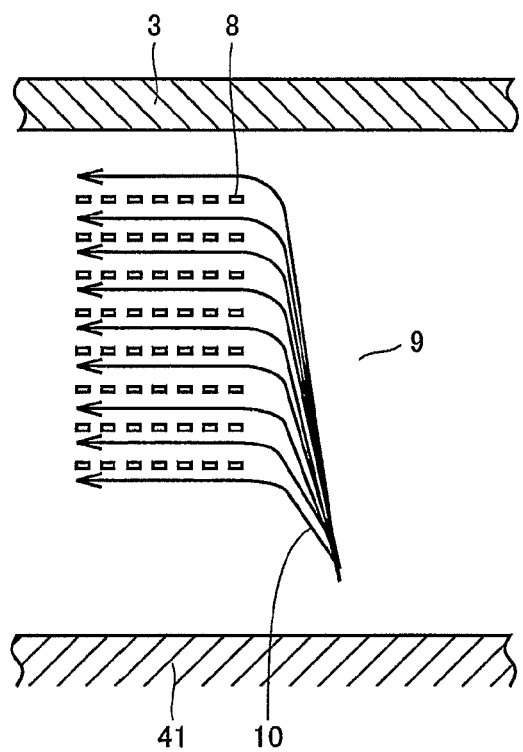
FIG. 20 is a diagram showing an airflow in the transformer according to the third embodiment of the present invention while a vehicle remains stopped.

FIG. 20 is a diagram showing an airflow in the transformer according to the third embodiment of the present invention while the vehicle remains stopped. FIG. 20 shows a cross section of the cooling unit along XX-XX in FIG. 15.

Referring to FIG. 20, because cooling pipes 8 have a larger area in the direction at a right angle to natural convection, while the vehicle remains stopped, air is difficult to flow in the direction toward floor 3 of the vehicle from ground 41 in regions where cooling pipes 8 are provided. However, cooling unit 21 includes opening 9, which is a space surrounded by transforming unit 1 and cooling pipes 2. Opening 9 has a width that is at least greater than the spacing between cooling pipes 2 in the direction parallel to the extending surface of rail 4. This causes air to easily flow through opening 9 in the direction toward floor 3 of the vehicle from ground 41. Air 10 from opening 9 then flows horizontally, i.e., flows between cooling pipes 8 in the direction parallel to the extending surface of rail 4. Therefore, the cooling efficiency can be prevented from lowering.

As described above, in the transformer according to the third embodiment of the present invention, the cooling pipes have a shape different from a circular shape, to thereby reduce airflow stagnation that occurs in a back surface of each cooling pipe, i.e., in a region opposite to an airflow-receiving portion of each cooling pipe, thus allowing the pressure loss to be reduced. Therefore, the cooling performance can be increased.

While FIGS. 15 to 17 show the configuration in which each cooling pipe 2 is equally spaced by way of example, the present invention is not limited thereto. As in the first embodiment, the spacing between cooling pipes 2 may be increased toward transforming unit 1, and the spacing between cooling pipes 2 may be increased toward floor 3 of the vehicle. Such a configuration can further enhance the cooling performance.

The transformer is otherwise the same as the transformer according to the first embodiment in terms of configuration and operation; thus, the detailed description is not repeated herein.

Another embodiment of the present invention will be described next with reference to the drawings, in which the same or corresponding parts have the same reference characters allotted, and the description thereof will not be repeated.

Fourth Embodiment

The present embodiment relates to a transformer in which the structure of a cooling unit is modified, as compared to the transformer according to the third embodiment. The transformer according to the present embodiment is the same as the transformer according to the third embodiment except for the contents described below.

Figure 21:
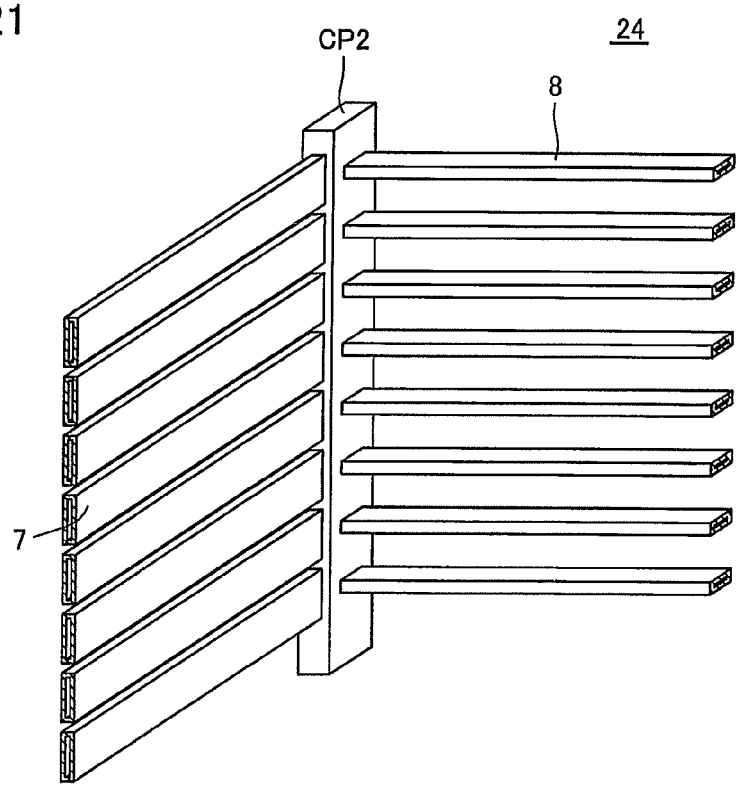
FIG. 21 is a diagram showing the configuration of cooling unit 21 in a transformer according to a fourth embodiment of the present invention.

FIG. 21 is a diagram showing in detail the configuration of cooling unit 21 in a transformer according to a fourth embodiment of the present invention.

Referring to FIG. 21, the transformer according to the fourth embodiment of the present invention includes a cooling unit 24 instead of cooling unit 23, as compared to the transformer according to the third embodiment of the present invention.

Cooling unit 24 includes a plurality of cooling pipes 2 that are arranged in eight stages vertically to the ground. Each of cooling pipes 2 includes cooling pipe 7, which is a portion that extends along a traveling direction A of a vehicle, and cooling pipe 8, which is a portion that extends in a direction crossing the traveling direction of the vehicle.

Cooling unit 24 also includes a common pipe CP2 that connects ends of the plurality of cooling pipes 7 and ends of the plurality of cooling pipes 8. This structure can increase the structural strength of cooling unit 21.

Further, the provision of common pipe CP2 allows the total number of cooling pipes 7 and the total number of cooling pipes 8 to be different, thus enabling a cooling design to be made in accordance with the amounts of heat generated during running and stopping of the vehicle.

Figure 22:
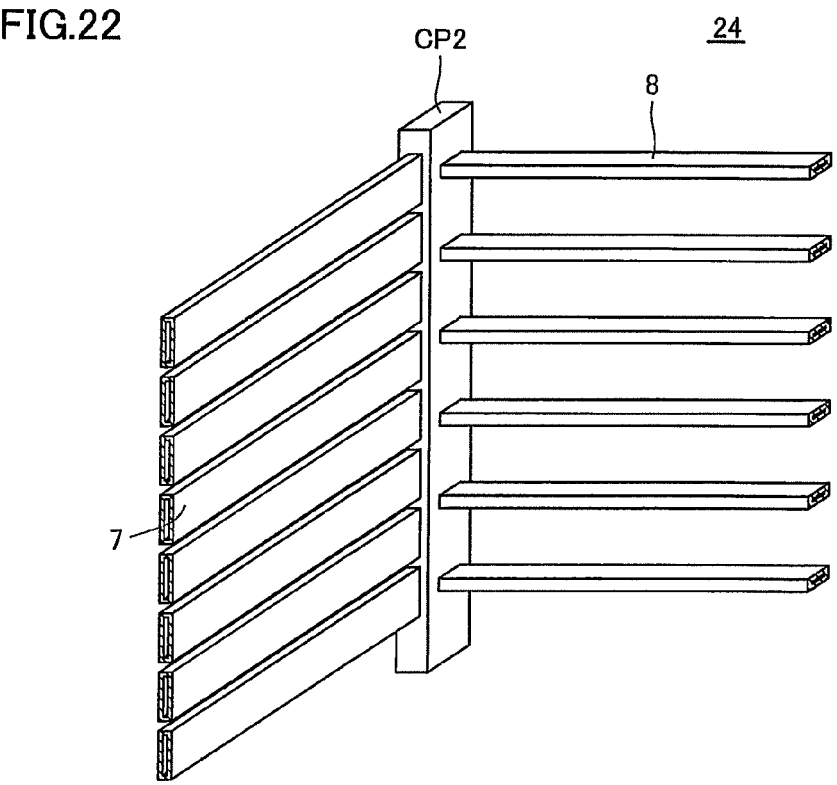
FIG. 22 is a diagram showing the configuration of a cooling unit in which the total number of cooling pipes 7 and the total number of cooling pipes 8 are different.

FIG. 22 is a diagram showing the configuration of a cooling unit in which the total number of cooling pipes 7 and the total number of cooling pipes 8 are different.

Referring to FIG. 22, when, for example, the number of cooling pipes 8 is made smaller than the number of cooling pipes 7, the cooling performance while a vehicle remains stopped can be enhanced relatively to that during running of the vehicle.

The transformer is otherwise the same as the transformer according to the third embodiment in terms of configuration and operation; thus, the detailed description is not repeated herein.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: transforming unit, 2, 7, 8, 27, 28: cooling pipe, 4: rail, 5: wheel, 13: coil, 14: iron core, 15: tank, 16: insulating oil, 17: pump, 21, 22, 23, 24: cooling unit, 31: input portion, 32: output portion, 101: transformer, 201: vehicle, P1, P2, P3: pipe, CP1, CP2: common pipe.

The invention claimed is:

1. A transformer for mounting on a vehicle, comprising:
a tank attached under a floor of said vehicle, the tank being for housing an iron core, a coil, and an insulating liquid, thereby immersing, said iron core and said coil in said insulating liquid; and
a cooling unit for air-cooling said insulating liquid that has flowed from said tank and returning said insulating liquid to said tank,
said cooling unit including a plurality of pipes arranged to be spaced from one another such that a spacing in a region relatively closer to the floor of said vehicle is greater than a spacing in a region relatively away from the floor of said vehicle.

2. The transformer according to claim 1, wherein
said cooling unit further includes a plurality of pipes arranged to be spaced from one another such that a spacing in a region relatively closer to said tank is greater than a spacing in a region relatively away from said tank.

3. The transformer according to claim 1, wherein
each of said plurality of pipes has a cross-sectional shape having a longitudinal direction and a shorter-side direction.

4. The transformer according to claim 3, wherein
each of said plurality of pipes is provided so as to have a first portion extending along a traveling direction of said vehicle, and is provided so that, in said first portion, said longitudinal direction corresponds to a vertical direction, and said shorter-side direction corresponds to a horizontal direction.

5. The transformer according to claim 3, wherein
each of said plurality of pipes is provided so as to have a second portion extending along a direction crossing a traveling direction of said vehicle, and
each of said plurality of pipes is provided so that, in said second portion, said shorter-side direction corresponds to a vertical direction, and said longitudinal direction corresponds to a horizontal direction.

6. The transformer according to claim 1, wherein
each of said plurality of pipes has a first portion extending along a traveling direction of said vehicle and a second portion extending along a direction crossing the traveling direction of said vehicle, and
said cooling unit further includes a common pipe that connects said first portions and said second portions of said plurality of pipes.

7. The transformer according to claim 6, wherein
said plurality of pipes are provided so that a total number of said first portions and a total number of said second portions are different.

* * * * *